US006436549B1

(12) United States Patent
Wang

(10) Patent No.: US 6,436,549 B1
(45) Date of Patent: Aug. 20, 2002

(54) BLOCK COPOLYMERS FROM MACROCYCLIC OLIGOESTERS AND DIHYDROXYL-FUNCTIONALIZED POLYMERS

(75) Inventor: Yi-Feng Wang, Waterford, NY (US)

(73) Assignee: Cyclics Corporation, Schenectady, NY (US)

( * ) Notice: Subject to any disclaimer, the term of this patent is extended or adjusted under 35 U.S.C. 154(b) by 0 days.

(21) Appl. No.: 09/906,385

(22) Filed: Jul. 16, 2001

(51) Int. Cl.[7] .......................... B32B 27/06; C08F 20/00
(52) U.S. Cl. .................. 428/480; 525/437; 525/439; 525/440; 525/444; 525/445; 525/446; 525/450; 524/783; 524/784
(58) Field of Search ................................ 525/437, 439, 525/440, 444, 445, 446, 450; 524/783, 784; 428/480

(56) References Cited

U.S. PATENT DOCUMENTS

| | | | |
|---|---|---|---|
| 3,018,272 A | 1/1962 | Griffing et al. | |
| 3,786,067 A | 1/1974 | Throckmorton et al. | 260/327 |
| 4,605,731 A | 8/1986 | Evans et al. | 528/371 |
| 4,616,077 A | 10/1986 | Silva | 528/371 |
| 4,638,077 A | 1/1987 | Brunelle et al. | 558/281 |
| 4,644,053 A | 2/1987 | Brunelle et al. | 528/371 |
| 4,727,134 A | 2/1988 | Brunelle et al. | 528/371 |
| 4,740,583 A | 4/1988 | Brunelle et al. | 528/370 |
| 4,757,132 A | 7/1988 | Brunelle et al. | 528/357 |
| 4,816,548 A | 3/1989 | Evans et al. | 528/370 |
| 4,829,144 A | 5/1989 | Brunelle et al. | 528/176 |
| 4,831,001 A | 5/1989 | Evans et al. | 502/153 |
| 4,888,411 A | 12/1989 | Shannon et al. | 528/199 |
| 4,904,810 A | 2/1990 | Brunelle et al. | 558/281 |
| 4,980,453 A | 12/1990 | Brunelle et al. | 528/352 |
| 4,992,228 A | 2/1991 | Heck et al. | 264/135 |
| 4,999,420 A | 3/1991 | Leitz et al. | 528/371 |
| 5,006,637 A | 4/1991 | Guggenheim et al. | 528/355 |
| 5,023,346 A | 6/1991 | Schon et al. | 549/231 |
| 5,039,783 A | 8/1991 | Brunelle et al. | 528/272 |
| 5,071,711 A | 12/1991 | Heck et al. | 428/542.8 |
| 5,095,088 A | 3/1992 | Wang | 528/203 |
| 5,097,008 A | 3/1992 | Krabbenhoft et al. | 528/371 |
| 5,116,900 A | 5/1992 | Flautt et al. | 524/377 |
| 5,191,013 A | 3/1993 | Cook et al. | 524/601 |
| 5,191,038 A | 3/1993 | Krabbenhoft et al. | 525/462 |
| 5,207,850 A | 5/1993 | Parekh | 156/166 |
| 5,214,158 A | 5/1993 | Brunelle et al. | 549/267 |
| 5,225,129 A | 7/1993 | van den Berg | 264/85 |
| 5,231,161 A | 7/1993 | Brunelle et al. | 528/272 |
| 5,241,880 A | 9/1993 | Mizobata et al. | 74/502.5 |
| RE34,431 E | 11/1993 | Brunelle et al. | 528/352 |
| 5,264,548 A | 11/1993 | Brunelle et al. | 528/370 |
| 5,281,669 A | 1/1994 | Kambour et al. | 525/177 |
| 5,288,837 A | 2/1994 | Munjal et al. | 528/198 |
| 5,300,392 A | 4/1994 | Odell et al. | 430/130 |
| 5,300,393 A | 4/1994 | Odell et al. | 430/134 |

(List continued on next page.)

FOREIGN PATENT DOCUMENTS

| | | |
|---|---|---|
| BE | 676324 | 6/1966 |
| DE | 3607627 | 9/1987 |
| DE | 4034574 | 5/1992 |
| EP | 0000544 | 8/1982 |
| EP | 419254 A2 | 3/1991 |
| EP | 486832 A2 | 5/1992 |
| EP | 264835 B1 | 6/1992 |
| EP | 235741 B1 | 1/1993 |
| EP | 543492 A1 | 5/1993 |
| EP | 589640 A1 | 3/1994 |
| EP | 598604 A1 | 5/1994 |
| EP | 601753 A1 | 6/1994 |
| EP | 635512 A1 | 1/1995 |
| EP | 655476 A1 | 5/1995 |
| EP | 436186 B1 | 10/1995 |
| EP | 688778 A1 | 12/1995 |
| EP | 699701 A3 | 9/1996 |
| GB | 957841 | 5/1964 |
| GB | 991020 | 5/1965 |
| JP | 4621873 | 6/1971 |

(List continued on next page.)

OTHER PUBLICATIONS

Ahjopalo, L. et al. (2000) "Cyclic Oligomers in Saturated Polyesters" Polymer, vol. 41, No. 23, 8283–8290.

Brunelle (1995) "Macrocycles For The Synthesis of High Molecular Weight Polymers" *Macromolecules*, 197–235.

Brunelle et al. (1998) "Semicrystalline Polymers via Ring–Opening Polymerization: Preparation and Polymerization of Alkylene Phthalate Cyclic Oligomers" *Macromolecules* vol. 31, 4782–4790.

Burch, R. R. et al. (2000) "Synthesis of Cyclic Oligoesters and Their Rapid Polymerization to High Molecular Weight" Macromolecules, vol. 33, No. 14, 5053–5064.

Cotton, N. J. et al. (1993) "Rate and Extent of Supercritical Fluid Extraction of Cyclic Trimer from Poly(Ethylene Terephthalate) at Elevated Temperatures" *Journal of Chromatographic Science*, vol. 31, No. 5, 157–161.

Hamilton et al. (1998) "Cyclic Polyesters: Part 8. Preparation and Characterization of Cyclic Oligomers in Six Aromatic Ester and Ether–Ester Systems" *Polymer* vol. 39, No. 14., 3241–3252.

Harrison, A. G. et al. (1997) "Analysis of cyclic oligomers of poly(ethylene terephthalate) by liquid chromatography/mass spectrometry" Polymer Communications, vol. 38, No. 10, 2549–2555.

(List continued on next page.)

*Primary Examiner*—Samuel A. Acquah
(74) *Attorney, Agent, or Firm*—Testa Hurwitz & Thibeault, LLP

(57) ABSTRACT

Block copolymers are prepared from polymerization of a macrocyclic oligoester and a dihydroxyl-functionalized polymer at an elevated temperature in the presence of a polymerization catalyst.

47 Claims, No Drawings

U.S. PATENT DOCUMENTS

| | | | |
|---|---|---|---|
| 5,300,590 A | 4/1994 | Cook et al. | 525/444 |
| 5,302,484 A | 4/1994 | Odell et al. | 430/127 |
| 5,314,779 A | 5/1994 | Odell et al. | 430/127 |
| 5,321,117 A | 6/1994 | Brunelle | 528/272 |
| 5,340,909 A | 8/1994 | Doerr et al. | 528/276 |
| 5,348,985 A | 9/1994 | Pearce et al. | 521/124 |
| 5,356,984 A | 10/1994 | Carbone et al. | 524/431 |
| 5,386,037 A | 1/1995 | Takekoshi et al. | 549/206 |
| 5,387,666 A | 2/1995 | Takekoshi et al. | 528/283 |
| 5,389,719 A | 2/1995 | Takekoshi et al. | 524/784 |
| 5,407,984 A | 4/1995 | Brunelle et al. | 524/178 |
| 5,410,014 A | 4/1995 | Haese et al. | 528/196 |
| 5,420,226 A | 5/1995 | Hamer et al. | 528/201 |
| 5,434,244 A | 7/1995 | Warner et al. | 528/490 |
| 5,446,122 A | 8/1995 | Warner et al. | 528/279 |
| 5,466,744 A | 11/1995 | Evans et al. | 524/714 |
| 5,498,651 A | 3/1996 | Brunelle | 524/176 |
| 5,527,976 A | 6/1996 | Takekoshi et al. | 585/16 |
| 5,530,052 A | 6/1996 | Takekoshi et al. | 524/447 |
| 5,591,800 A | 1/1997 | Takekoshi et al. | 524/783 |
| 5,605,979 A | 2/1997 | Priddy, Jr. et al. | 525/439 |
| 5,637,655 A | 6/1997 | Priddy, Jr. et al. | 525/438 |
| 5,646,306 A | 7/1997 | Elsasser, Jr. | 549/267 |
| 5,648,454 A | 7/1997 | Brunelle | 528/491 |
| 5,661,214 A | 8/1997 | Brunelle et al. | 524/783 |
| 5,663,282 A | 9/1997 | Todt et al. | 528/274 |
| 5,668,186 A | 9/1997 | Brunelle et al. | 521/48 |
| 5,693,722 A | 12/1997 | Priddy, Jr. et al. | 525/439 |
| 5,700,888 A | 12/1997 | Hall | 526/190 |
| 5,707,439 A | 1/1998 | Takekoshi et al. | 106/483 |
| 5,710,086 A | 1/1998 | Brunelle et al. | 502/171 |
| 5,756,644 A | 5/1998 | Hodge et al. | 528/272 |
| 5,760,161 A | 6/1998 | Goins, Jr. et al. | 528/299 |
| 5,786,440 A | 7/1998 | Kohler et al. | 528/196 |
| 5,795,423 A | 8/1998 | Johnson | 156/166 |
| 5,830,541 A | 11/1998 | Carswell et al. | 427/475 |
| 5,936,029 A | 8/1999 | Hall | 524/572 |
| 5,968,642 A | 10/1999 | Saito | 428/304.4 |
| 6,121,466 A | 9/2000 | Osterholt et al. | 549/267 |
| 6,297,330 B1 | 10/2001 | Burch, Jr. et al. | |

FOREIGN PATENT DOCUMENTS

| | | |
|---|---|---|
| JP | 476425 | 8/1972 |
| JP | 6275547 | 4/1987 |
| JP | 02298512 | 12/1990 |
| JP | 09048876 | 2/1997 |
| JP | 2001031846 | 2/2001 |
| SU | 1077893 | 3/1984 |
| WO | 88/06605 | 9/1988 |
| WO | 91/09899 | 7/1991 |
| WO | 93/04106 | 3/1993 |
| WO | 95/30702 | 11/1995 |
| WO | 00/27632 | 5/2000 |

OTHER PUBLICATIONS

Henshaw et al. (1994) "Recycling of a Cyclic Thermoplastic Composite Material by Injection and Compression Molding" *J. of Thermoplastic Composite Materials* vol. 7 (1), 14–29.

Hubbard, P. A. (1996) "Polyesters via Macrocyclic Oligomers" Dissertation presented at the University of Akron.

Kricheldorf, H. R. et al. (1997) "Macrocycles IV. Macrocyclic Polylactones as Bifunctional Monomers for Polycondensations" *Journal of Polymer Science*, vol. 36, No. 9, 1373–1378.

Kricheldorf, H. R. et al. (1998) "Macrocycles. 3. Telechelic Polylactones via Macrocyclic Polymerization" Macromolecules, vol. 31, No. 3, 614–620.

Lattimer et al. (1988) "MALDI–MS Analysis of Pyrolysis Products From a Segmented Polyurethane" *Journal of Analytical and Applied Pyrolysis*, vol. 48, 1–15.

Liu et al. (1999) "Preparation of Cyclic Polyester Oligomers and Ultra–low VOC Polyester Coatings" *Polymer Preprints*, vol. 40, No. 1.

Martin et al. "Pultrusion" 533–543.

Miller, S. (1998) "Macrocyclic polymers from cyclic oligomers of poly(butylene terephthalate)" Dissertation Presented at University of Massachusetts, Amherst, MA US.

Mueller, F. J. et al. (1983) "Synthesis of Cyclic Oligomers of Butylene Terephthalate" *Makromol. Chem.*, vol. 184, No. 12, 2487–95.

Mueller, F. J. et al. (1983) "Synthesis of Cyclic Oligomers of Butylene Terephthalate" *Makromol. Chem.*, vol. 184, No. 12, 2487–95. (Translation).

Perovic, A. (1985) "Morphological Instability of poly(ethylene terephthalate) cyclic oligomer crystals" *Journal of Material Science*, vol. 20, Iss. 4, 1370–1374.

Perovic et al. (1982) "Crystallization of Cyclic Oligomers in Commercial Poly(ethleneterephthalate) Films" *Polymer Bulletin* vol. 6, 277–283.

Roelens, S. (1988) "Organotin–Mediated Synthesis of Macrocyclic Polyesters: Mechanism and Selectivity in the Reaction of Dioxastannolanes with Diacyl Dichlorides" *Journal of the Chemical Society, Perkin Transactions 2*, vol. 8, 1617–1625.

Brunelle (1995) "Macrocycles For The Synthesis of High Molecular Weight Polymers" pp. 197–235, ch. 6, New Methods of Polymer Synthesis: vol. 2, edited by J.R. Ebdon and G.C. Eastmond.

Martin et al. (1987) "Pultrusion", *Engineered Materials Handbook: vol. 1 Composites*, pp. 533–543.

BLOCK COPOLYMERS FROM MACROCYCLIC OLIGOESTERS AND DIHYDROXYL-FUNCTIONALIZED POLYMERS

TECHNICAL FIELD

This invention generally relates to thermoplastics and articles formed therefrom. More particularly, the invention relates to block copolymers and their preparation from macrocyclic oligoesters and dihydroxyl-functionalized polymers.

BACKGROUND INFORMATION

Linear polyesters such as poly(alkylene terephthalate) are generally known and commercially available where the alkylene typically has 2 to 8 carbon atoms. Linear polyesters have many valuable characteristics including strength, toughness, high gloss, and solvent resistance. Linear polyesters are conventionally prepared by the reaction of a diol with a dicarboxylic acid or its functional derivative, typically a diacid halide or ester. Linear polyesters may be fabricated into articles of manufacture by a number of known techniques including extrusion, compression molding, and injection molding.

Recently, macrocyclic oligoesters were developed which are precursors to linear polyesters. Macrocyclic oligoesters exhibit low melt viscosity, which can be advantageous in some applications. Furthermore, certain macrocyclic oligoesters melt and polymerize at temperatures well below the melting point of the resulting polymer. Upon melting and in the presence of an appropriate catalyst, polymerization and crystallization can occur virtually isothermally.

Block copolymers such as copolyester elastomers are known that are typically prepared from short-chain aliphatic diols, aromatic diacids, and polyalkylene ether diols. For example, one commercial product is a copolymer of 1,4-butanediol, dimethyl terephthalate, and polytetramethylene ether glycol. This copolymer is prepared via polycondensation reactions in two steps at high temperature and high vacuum. The polycondensation reactions may take tens of hours or even days. In addition, the high temperature (about 250° C.) that is necessary for the polycondensation reactions causes significant degradation of polytetramethylene ether glycol. Furthermore, the molecular weight of polytetramethylene ether glycol is limited to 1000 or less in order to minimize significant phase separation during the polycondensation reaction.

SUMMARY OF THE INVENTION

Block copolymers of high molecular weight have been prepared from macrocyclic oligoesters and dihydroxyl-functionalized polymers at an elevated temperature in the presence of a transesterification catalyst. The methods of the invention allow the design and control of the elasticity, the crystallinity, the ductility, and the molecular weight of the resulting block copolymers, while retaining other desirable properties of polyesters prepared from macrocyclic oligoesters as precursors.

In one aspect, the invention generally features a method for making a block copolymer. In one embodiment, the method includes the step of contacting a macrocyclic oligoester and a dihydroxyl-functionalized polymer at an elevated temperature in the presence of a transesterification catalyst. The co-polymerization produces a block copolymer of polyester (derived from the macrocyclic oligoester) and the dihydroxyl-functionalized polymer. The macrocyclic oligoester has a structural repeat unit of formula (I):

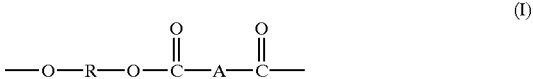

(I)

wherein R is an alkylene, a cycloalkylene, or a mono- or polyoxyalkylene group; and A is a divalent aromatic or alicyclic group.

In another aspect, the invention features a method for making high molecular weight block copolymer. In one embodiment, the method includes the steps of: (a) contacting a macrocyclic oligoester and a dihydroxyl-functionalized polymer at an elevated temperature in the presence of a transesterification catalyst to produce a block copolymer of polyester and the dihydroxyl-functionalized polymer; and (b) heating the block copolymer in the presence of a chain extension agent. The chain extension step results in a higher molecular weight block copolymer of polyester and the dihydroxyl-functionalized polymer.

In yet another aspect, the invention features another method for making high molecular weight block copolymer. In one embodiment, the method includes the steps of (a) heating a dihydroxyl-functionalized polymer with a diester in the presence of a transesterification catalyst, thereby producing a chain-extended dihydroxyl-functionalized polymer; and (b) contacting the chain-extended dihydroxyl-functionalized polymer with a macrocyclic oligoester at an elevated temperature in the presence of a transesterification catalyst. The co-polymerization produces a block copolymer of polyester and the chain-extended dihydroxyl-functionalized polymer.

In yet another aspect, the invention generally features a method for extending the chain length of a polyester polymer. In one embodiment, the method includes the step of contacting the polyester polymer and a chain extension agent at an elevated temperature.

In yet another aspect, the invention features a block copolymer. The block copolymer has at least two block units. The first block unit has, within its polymeric backbone, at least one first structural unit of formula (II)

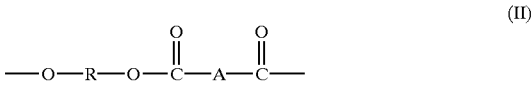

(II)

where R is an alkylene, or a cycloalkylene or a mono- or polyoxyalkylene group, and A is a divalent aromatic or alicyclic group. The second block unit has, within its polymeric backbone, at least one second structural unit of formula (III)

—B— (III)

where B is an alkylene, or a cycloalkylene or a mono- or polyoxyalkylene group. One or more of the carbon atoms in B may be replaced with an oxygen atom, a nitrogen atom, or a sulfur atom.

The foregoing and other objects, aspects, features, and advantages of the invention will become more apparent from the following description and claims.

DESCRIPTION

In an embodiment according to the present invention, high molecular weight block copolymers can be prepared from macrocyclic oligoesters and dihydroxyl-functionalized polymers at an elevated temperature in the presence of a transesterification catalyst.

Definitions

The following general definitions may be helpful in understanding the various terms and expressions used in this specification.

As used herein, a "macrocyclic" molecule means a cyclic molecule having at least one ring within its molecular structure that contains 8 or more atoms covalently connected to form the ring.

As used herein, an "oligomer" means a molecule that contains 2 or more identifiable structural repeat units of the same or different formula.

As used herein, an "oligoester" means a molecule that contains 2 or more identifiable ester functional repeat units of the same or different formula.

As used herein, a "macrocyclic oligoester" means a macrocyclic oligomer containing 2 or more identifiable ester functional repeat units of the same or different formula. A macrocyclic oligoester typically refers to multiple molecules of one specific formula having varying ring sizes. However, a macrocyclic oligoester may also include multiple molecules of different formulae having varying numbers of the same or different structural repeat units. A macrocyclic oligoester may be a co-oligoester or multi-oligoester, i.e., an oligoester having two or more different structural repeat units having an ester functionality within one cyclic molecule.

As used herein, a "dihydroxyl-functionalized polymer" means a polymer having at least two hydroxyl functional groups. Typically, the at least two hydroxyl functional groups are at the ends of a polymer chain. However, the polymer may be branched and each of the two or more of branches of the polymer chain may have a hydroxyl functionalized end.

As used herein, "an alkylene group" means —$C_nH_{2n}$—, where $n \geq 2$.

As used herein, "a cycloalkylene group" means a cyclic alkylene group, —$C_nH_{2n-x}$—, where x represents the number of H's replaced by cyclization(s).

As used herein, "a mono- or polyoxyalkylene group" means [—$(CH_2)_m$—O—]$_n$—$(CH_2)_m$—, wherein m is an integer greater than 1 and n is an integer greater than 0.

As used herein, "a divalent aromatic group" means an aromatic group with links to other parts of the macrocyclic molecule. For example, a divalent aromatic group may include a meta- or para- linked monocyclic aromatic group (e.g., benzene).

As used herein, "an alicyclic group" means a non-aromatic hydrocarbon group containing a cyclic structure therein.

As used herein, a "block copolymer" means a copolymer having segments of two or more polymers linked to one another. A block copolymer has constitutionally different structural units. Adjacent segments (i.e., blocks) contain structural units derived from different characteristic species of monomer or from structural repeat units with different composition or sequence distribution.

As used herein, a "chain extension agent" means an agent which facilitates extension of a polymer (or oligomer) chain.

As used herein, "a polyester polymer composite" means a polyester polymer that is associated with another substrate such as a fibrous or particulate material. Illustrative examples of particulate material are chopped fibers, glass microspheres, and crushed stone. Certain fillers and additives thus can be used to prepare polyester polymer composites. A fibrous material means a more continuous substrate, e.g., fiberglass, ceramic fibers, carbon fibers or organic polymers such as aramid fibers.

Block Copolymers

High molecular weight copolymers have been prepared from macrocyclic oligoesters and dihydroxyl-functionalized polymers at an elevated temperature in the presence of a transesterification catalyst.

In one aspect, the invention generally features a method for making a block copolymer. In one embodiment, the method includes the step of contacting a macrocyclic oligoester and a dihydroxyl-functionalized polymer at an elevated temperature in the presence of a transesterification catalyst. The co-polymerization produces a block copolymer of polyester and the dihydroxyl-functionalized polymer. The macrocyclic oligoester has a structural repeat unit of formula (I):

wherein R is an alkylene, a cycloalkylene, or a mono- or polyoxyalkylene group; and A is a divalent aromatic or alicyclic group.

The co-polymerization reaction between a macrocyclic polyester oligomer and a dihydroxyl-functionalized polymer is typically completed within minutes. The duration of the co-polymerization reaction depends on many factors including the molar ratio of the macrocyclic oligoester to the di-hydroxyl-functionalized polymer, the molar ratio of the catalyst to the macrocylic oligoester and the di-hydroxyl-functionalized polymer, the temperature at which the co-polymerization reaction is carried out, the desired molecular weight of the resulting block copolymer, and the choice of solvent and other reaction conditions. The co-polymerization reaction is preferably conducted under an inert environment, such as under nitrogen or argon, or under a vacuum.

The weight ratio of the dihydroxyl-functionalized polymer to macrocyclic oligoester can vary from about 0.01 to 10. In one embodiment, the molar ratio of cyclic ester to macrocyclic oligoester is between about 0.01 to about 0.1. In another embodiment, the molar ratio of cyclic ester to macrocyclic oligoester is between about 0.1 to about 1.0. In yet another embodiment, the molar ratio of cyclic ester to macrocyclic oligoester is between about 1.0 to about 5.0. In yet another embodiment, the molar ratio of cyclic ester to macrocyclic oligoester is between about 5.0 to about 10.

The molar ratio of the transesterification catalyst to the macrocyclic oligoester can range from about 0.01 to about 10 mole percent. In one embodiment, the molar ratio of the catalyst to the macrocyclic oligoester is from about 0.01 to about 0.1 mole percent. In another embodiment, the molar ratio of the catalyst to the macrocyclic oligoester is from about 0.1 to about 1 mole percent. In yet another embodiment, the molar ratio of the catalyst to the macrocyclic oligoester is from about 1 to about 10 mole percent.

The co-polymerization reaction between the macrocyclic oligoester and the dihydroxyl-functionalized polymer is carried out at an elevated temperature. In one embodiment, the temperature at which the co-polymerization is conducted ranges from about 130° C. to about 300° C. In yet another embodiment, the temperature at which the co-polymerization is conducted ranges from about 150° C. to about 260° C. In yet another embodiment, the temperature at which the co-polymerization is conducted ranges from about 170° C. to about 210° C. In yet another embodiment, the temperature at which the co-polymerization is conducted ranges from about 180° C. to about 190° C.

Yields of block copolymer depend on, among other factors, the precursor macrocyclic oligoester(s) used, the dihydroxyl-functionalized polymer(s) used, the polymerization catalyst(s) used, the reaction time, the reaction conditions, the presence or absence of chain-extension agent (s), and the work-up procedure. Typical yields range from about 90% to about 98% of the macrocyclic oligoester used. In one embodiment, the yield is within a range from about 92% to about 95%.

Block copolymers may be designed and prepared according to methods of the invention to achieve desired elasticity, crystallinity, and/or ductility. Block copolymers having a high weight percentage of the dihydroxyl-functionalized polymer content (e.g., polytetramethylene ether glycol), for example, exhibit an increased toughness and become elastomaric. Similar block copolymers having a low weight percentage of the dihydroxyl-functionalized polymer content exhibit an increased elasticity.

The co-polymerization reaction may be carried out with or without a solvent. A solvent may be used to dissolve one or more of the reactants and/or to mix the reactants. A solvent may also be used as a medium in which the reaction is carried out. Illustrative solvents that may be used include high-boiling compounds such as o-dichlorobenzene and meta-terphenyl. In another embodiment, no solvent is used in the co-polymerization reaction.

In one embodiment, the above method further includes a step of heating the block copolymer in the presence of a chain extension agent, thereby producing a block copolymer with a higher molecular weight. The chain extension agent may be any material that facilitates chain extension of the block copolymer including, for example, diacid chlorides, diisocyanates, and diepoxides. In one embodiment, 4,4'-methylenebis(phenyl isocyanate) is used as the chain extension agent. In another embodiment, terephthaloyl chloride is used as the chain extension agent. In yet another embodiment, a tin or a titanate compound is used as a chain extension agent. In yet another embodiment, two or more of these and other chain extension agents may be used together or sequentially.

The step of heating the block copolymer in the presence of a chain extension agent may be conducted at a temperature within a range from about 130° C. to about 300° C. In one embodiment, the step of heating the block copolymer in the presence of a chain extension agent is conducted at a temperature within a range from about 150° C. to about 260° C. In another embodiment, the step of heating the block copolymer in the presence of a chain extension agent is conducted at a temperature within a range from about 170° C. to about 210° C. In yet another embodiment, the step of heating the block copolymer in the presence of a chain extension agent is conducted at a temperature within a range from about 180° C. to about 190° C.

One of the reactants employed in various embodiments of the invention to prepare block copolymers is a macrocyclic oligoester. Many different macrocyclic oligoesters readily can be made and are useful in the practice of this invention. Thus, depending on the desired properties of the final block copolymer product, the appropriate macrocyclic oligoester (s) can be selected for use in its manufacture.

Macrocyclic oligoesters that may be employed in this invention include, but are not limited to, macrocyclic poly (alkylene dicarboxylate) oligomers having a structural repeat unit of the formula:

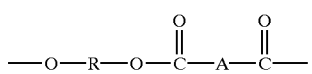

wherein R is an alkylene, a cycloalkylene, or a mono- or polyoxyalkylene group; and A is a divalent aromatic or alicyclic group.

Preferred macrocyclic oligoesters are macrocyclic oligoesters of 1,4-butylene terephthalate, 1,3-propylene terephthalate, 1,4-cyclohexylenedimethylene terephthalate, ethylene terephthalate, and 1,2-ethylene 2,6-naphthalenedicarboxylate, and macrocyclic co-oligoesters comprising two or more of the above structural repeat units.

Synthesis of the macrocyclic oligoesters may be achieved by contacting at least one diol of the formula HO—R—OH with at least one diacid chloride of the formula:

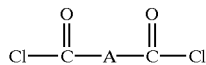

where R and A are as defined above. The reaction typically is conducted in the presence of at least one amine that has substantially no steric hindrance around the basic nitrogen atom. An illustrative example of such amines is 1,4-diazabicyclo[2.2.2]octane (DABCO). The reaction usually is conducted under substantially anhydrous conditions in a substantially water invincible organic solvent such as methylene chloride. The temperature of the reaction typically is within the range of from about −25° C. to about 25° C. See, e.g., U.S. Pat. No. 5,039,783 to Brunelle et al.

Macrocyclic oligoesters also can be prepared via the condensation of a diacid chloride with at least one bis (hydroxyalkyl) ester such as bis(4-hydroxybutyl) terephthalate in the presence of a highly unhindered amine or a mixture thereof with at least one other tertiary amine such as triethylamine. The condensation reaction is conducted in a substantially inert organic solvent such as methylene chloride, chlorobenzene, or a mixture thereof. See, e.g., U.S. Pat. No. 5,231,161 to Brunelle et al.

Another method for preparing macrocyclic oligoesters or macrocyclic co-oligoesters is the depolymerization of linear polyester polymers in the presence of an organotin or titanate compound. In this method, linear polyesters are converted to macrocyclic oligoesters by heating a mixture of linear polyesters, an organic solvent, and a transesterification catalyst such as a tin or titanium compound. The solvents used, such as o-xylene and o-dichlorobenzene, usually are substantially free of oxygen and water. See, e.g., U.S. Pat. Nos. 5,407,984 to Brunelle et al. and 5,668,186 to Brunelle et al.

It is also within the scope of the invention to employ macrocyclic co-oligoesters to produce block copolymers. Therefore, unless otherwise stated, an embodiment of a composition, article, or methods that refers to macrocyclic oligoesters also includes embodiments utilizing macrocyclic co-oligoesters.

Dihydroxyl-functionalized polymers employed in various embodiments of the invention include any dihydroxyl-functionalized polymer that reacts with a macrocyclic oligoester to form a block copolymer under transesterification conditions. Illustrative examples of classes of dihydroxyl-functionalized polymers include polyethylene ether glycols, polypropylene ether glycols, polytetramethylene ether glycols, polyolefin diols, polycaprolactone diols, polyperfluoroether diols, and polysiloxane diols. Illustrative examples of dihydroxyl-functionalized polymers include dihydroxyl-functionalized polyethylene terephthalate and dihydroxyl-functionalized polybutylene terephthalate. The molecular weight of the dihydroxyl-functionalized polymer used may be, but is not limited to, about 500 to about 100,000. In one embodiment, the molecular weight of the dihydroxyl-functionalized polymer used is within a range from about 500 to about 50,000. In another embodiment, the molecular weight of the dihydroxyl-functionalized polymer used is within a range from about 500 to about 10,000.

Catalysts employed in the invention are those that are capable of catalyzing a transesterification polymerization of a macrocyclic oligoester with a dihydroxyl-functionalized polymer. One or more catalysts may be used together or sequentially. As with state-of-the-art processes for polymerizing macrocyclic oligoesters, organotin and organotitanate compounds are the preferred catalysts, although other catalysts may be used.

Illustrative examples of classes of tin compounds that may be used in the invention include monoalkyltin(IV) hydroxide oxides, monoalkyltin(IV) chloride dihydroxides, dialkyltin(IV) oxides, bistrialkyltin(IV) oxides, monoalkyltin(IV) trisalkoxides, dialkyltin(IV) dialkoxides, trialkyltin(IV) alkoxides, tin compounds having the formula (IV):

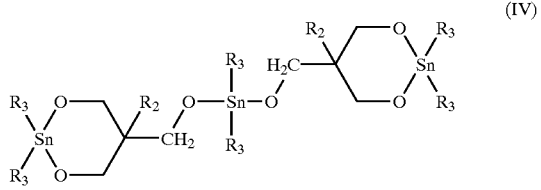

and tin compounds having the formula (V):

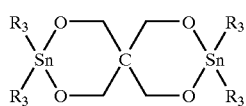

wherein $R_2$ is a $C_{1-4}$ primary alkyl group, and $R_3$ is $C_{1-10}$ alkyl group.

Specific examples of organotin compounds that may be used in this invention include dibutyltin dioxide, 1,1,6,6-tetra-n-butyl-1,6-distanna-2,5,7,10-tetraoxacyclodecane, n-butyltin(IV) chloride dihydroxide, di-n-butyltin(IV) oxide, dibutyltin dioxide, di-n-octyltin oxide, n-butyltin tri-n-butoxide, di-n-butyltin(IV) di-n-butoxide, 2,2-di-n-butyl-2-stanna-1,3-dioxacycloheptane, and tributyltin ethoxide. See, e.g., U.S. Pat. No. 5,348,985 to Pearce et al. In addition, tin catalysts described in commonly owned U.S. Ser. No. 09/754,943 (incorporated by reference below) may be used in the polymerization reaction.

Titanate compounds that may be used in the invention include titanate compounds described in commonly owned U.S. Ser. No. 09/754,943 (incorporated by reference below). Illustrative examples include tetraalkyl titanates (e.g., tetra (2-ethylhexyl) titanate, tetraisopropyl titanate, and tetrabutyl titanate), isopropyl titanate, titanate tetraalkoxide. Other illustrative examples include (a) titanate compounds having the formula (VI):

wherein each $R_4$ is independently an alkyl group, or the two $R_4$ groups taken together form a divalent aliphatic hydrocarbon group; $R_5$ is a $C_{2-10}$ divalent or trivalent aliphatic hydrocarbon group; $R_6$ is a methylene or ethylene group; and n is 0 or 1, (b) titanate ester compounds having at least one moiety of the formula (VII):

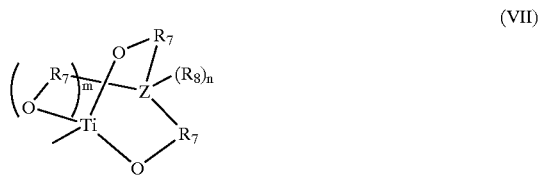

wherein each $R_7$ is independently a $C_{2-3}$ alkylene group; Z is O or N; $R_8$ is a $C_{1-6}$ alkyl group or unsubstituted or substituted phenyl group; provided when Z is O, m=n=0, and when Z is N, m=0 or 1 and m+n =1, and (c) titanate ester compounds having at least one moiety of the formula (VIII):

wherein each $R_9$ is independently a $C_{2-6}$ alkylene group; and q is 0 or 1.

The resulting high molecular weight block copolymer of polyester and the dihydroxyl-functionalized polymer may have a molecular weight within a range from about 10,000 to 300,000. In one embodiment, the molecular weight of the block copolymer of polyester and the dihydroxyl-functionalized polymer is within a range from about 10,000 to about 70,000. In another embodiment, the molecular weight of the block copolymer of polyester and the dihydroxyl-functionalized polymer is within a range from about 70,000 to about 150,000. In yet another embodiment, the molecular weight of the block copolymer of polyester and the dihydroxyl-functionalized polymer is within a range from about 150,000 to about 300,000.

In another aspect, the invention relates to a method for making high molecular weight block copolymer comprising the steps of contacting a macrocyclic oligoester and a dihydroxyl-functionalized polymer at an elevated temperature in the presence of a transesterification catalyst to produce a block copolymer of polyester and the dihydroxyl-functionalized polymer; and heating the block copolymer in the presence of a chain extension agent, thereby producing a high molecular weight block copolymer of polyester and the dihydroxyl-functionalized polymer.

In one embodiment, a high molecular weight block copolymer is produced after heating the block copolymer of polyester and the dihydroxyl-functionalized polymer produced in the first step in the presence of a chain extension agent. The step of heating the block copolymer in the presence of a chain extension agent is conducted at a temperature within a range from about 130° C. to about 300° C. In one embodiment, the step of heating the block copolymer in the presence of a chain extension agent is conducted at a temperature within a range from about 150° C. to about 260° C. In another embodiment, the step of heating the block copolymer in the presence of a chain extension agent is conducted at a temperature within a range from about 170° C. to about 210° C. In yet another embodiment, the step of heating the block copolymer in the presence of a chain extension agent is conducted at a temperature within a range from about 180° C. to about 190° C.

In yet another aspect, the invention features a block copolymer. The block copolymer contains at least a first block unit and a second block unit. The first block unit has, within its polymeric backbone, at least one structural unit of formula (II)

(II)

where R is an alkylene, or a cycloalkylene or a mono- or polyoxyalkylene group, and A is a divalent aromatic or alicyclic group. The second block unit has, within its polymeric backbone, at least one second structural unit of formula (III)

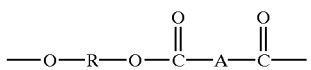
(III)

where B is an alkylene, or a cycloalkylene or a mono- or polyoxyalkylene group, one or more of the carbon atoms in B may be replaced with an oxygen atom, a nitrogen atom, or a sulfur atom.

Illustrative examples of block unit B include a polyethylene ether group, a polypropylene ether group, a polymethylene ether group, a polyolefin group, a polycaprolactone group, a polyperfluoroether diol, and a polysiloxane diol.

The block copolymer prepared from a macrocyclic oligoester and a di-hydroxyl-functionalized polymer may contain blocks derived from the macrocyclic oligoester, blocks derived from the dihydroxyl-functionalized polymer, and blocks derived from both the macrocyclic oligoester and the dihydroxyl-functionalized polymer. The length of the individual blocks and the sequence thereof can be designed to, serve particular applications.

In another aspect, the invention features a method for making high molecular weight block copolymer. In one embodiment, the method includes the steps of: (a) heating a dihydroxyl-functionalized polymer and a diester in the presence of a chain extension agent, thereby producing a chain-extended dihydroxyl-functionalized polymer; and (b) contacting the chain-extended dihydroxyl-functionalized polymer and a macrocyclic oligoester at an elevated temperature in the presence of a transesterification catalyst. The co-polymerization produces a block copolymer of polyester and the chain-extended dihydroxyl-functionalized polymer.

The diester that may be employed include dialkyl terephthalates such as dimethyl terephthalate and dimethyladipate.

The step of heating a dihydroxyl-functionalized polymer with a diester in the presence of a transesterification catalyst may be conducted at a temperature within a range from about 130° C. to about 300° C. In one embodiment, the step of heating a dihydroxyl-functionalized polymer with a diester in the presence of a transesterification catalyst is conducted at a temperature within a range from about 150° C. to about 260° C. In another embodiment, the step of heating a dihydroxyl-functionalized polymer with a diester in the presence of a transesterification catalyst is conducted at a temperature within a range from about 170° C. to about 210° C. In yet another embodiment, the step of heating a dihydroxyl-functionalized polymer with a diester in the presence of a transesterification catalyst is conducted at a temperature within a range from about 180° C. to about 190° C.

The amount of the diester used depends on factors including the desired molecular weight of the block copolymer to be produced. In one embodiment, the molar ratio of the diester to the dihydroxyl-functionalized polymer is within a range from about 0.1000 to about 0.9999.

The step of heating a dihydroxyl-functionalized polymer with a diester in the presence of a transesterification catalyst may be conducted under a vacuum. It may also be conducted in an inert environmental such as argon or nitrogen. The reaction is completed within about 5 minutes to about 45 minutes, and typically within about 30 minutes.

In another aspect, the invention features a method for extending the chain length of a polyester polymer. In one embodiment, the method includes the step of contacting the polyester polymer and a chain extension agent at an elevated temperature. The polyester polymer may be any polyester polymer including polybutylene terephthalate and polyethylene terephthalate.

The compositions and methods of the invention may be used to manufacture articles of various size and shape from various macrocyclic oligoesters and dihydroxyl-functionalized polymers. Exemplary articles that may be manufactured by the invention include without limitation automotive body panels and chassis components, bumper beams, aircraft wing skins, windmill blades, fluid storage tanks, tractor fenders, tennis rackets, golf shafts, windsurfing masts, toys, rods, tubes, bars stock, bicycle forks, and machine housings.

In the manufacture of an article, various types of fillers may be included. A filler often is included to achieve a desired purpose or property, and may be present in the resulting polyester polymer. For example, the purpose of the filler may be to provide stability, such as chemical, thermal or light stability, to the blend material or the polyester polymer product, and/or to increase the strength of the polyester polymer product. A filler also may provide or reduce color, provide weight or bulk to achieve a particular density, provide flame resistance (i.e., be a flame retardant), be a substitute for a more expensive material, facilitate processing, and/or provide other desirable properties as recognized by a skilled artisan. Illustrative examples of fillers are, among others, fumed silicate, titanium dioxide, calcium carbonate, chopped fibers, fly ash, glass microspheres, micro-balloons, crushed stone, nanoclay, linear polymers, and monomers. Fillers can be used to prepare polyester polymer composites.

Furthermore, in the manufacture of an article additional components (e.g., additives) may be added. Illustrative additives include colorants, pigments, magnetic materials, anti-oxidants, UV stabilizers, plasticizers, fire-retardants, lubricants, and mold releases.

EXAMPLES

The following examples are provided to further illustrate and to facilitate the understanding of the invention. These specific examples are intended to be illustrative of the invention. The products obtained from these examples may be confirmed by conventional techniques such as proton and carbon-13 nuclear magnetic resonance spectroscopy, mass spectroscopy, infrared spectroscopy, differential scanning calorimetry and gel permeation chromatography analyses.

Example A

The macrocyclic oligoesters employed was a mixture of oligomers having various degrees of polymerization with 95 mole percent 1,4-butylene terephthalate units and 5 mole percent ethylene terephthalate units. The macrocyclic oligoesters were prepared by heating a mixture of polyester linears, organic solvents, such as o-xylene and o-dichlorobenzene, which are substantially free of oxygen and water, and tin or titanium compounds as transesterification catalysts. See U.S. Pat. No. 5,668,186 (incorporated herein by reference in its entirety).

Example 1

A small vial (21×70 mm, 4 drum) equipped with a magnetic stir and a nitrogen/vacuum adaptor, was charged with 2.0 grams (8.91 mmol based on structural units) of the macrocyclic (1,4-butylene terephthalate) oligoester and predetermined amount of dihydroxyl terminated polymer. The mixture was dried by heating at about 190° C./1 torr for 5 minutes. The vacuum was released with nitrogen. A polymerization catalyst (0.30 mole percentage) was added as a solution in o-dichlorobenzene. The reaction time was measured from the time of catalyst addition. The time for the melt to stop the magnetic stirrer was noted as the end of the induction period. After the magnetic stirrer stopped, heating was continued under nitrogen for about 15 to 30 minutes during which time crystallization of the polymerized product began to yield white solid. At the end of the polymerization, the vial was cooled to room temperature and was broken to remove the polymer product. The polymer product was analyzed by gel permeation chromatography to determined percent polymerization and molecular weight relative to polystyrene. The results are shown in Table 1.

TABLE 1

Co-polymerization of Macrocyclic Oligoesters with Dihydroxyl-Functionalized Polymer at 190° C.

| Dihydroxyl-terminated polymer | Catalyst used | Dihydroxyl-terminated polymer, wt % | Induction Period, seconds[a] | Polymerization Time, minutes | Polymer Yield, % | Mw of Polymer |
|---|---|---|---|---|---|---|
| poly(ethylene-co-1,2-butylene) diol[b] | stannoxane[c] | 10 | 30 | 15 | 97 | 74,000 |
| Terathane 2900[d] | stannoxane[c] | 5 | 30 | 15 | 96 | 105,000 |
| Terathane 2900[d] | stannoxane[c] | 10 | 35 | 15 | 98 | 60,000 |
| Terathane 2900[d] | stannoxane[c] | 20 | 20 | 15 | 95 | 45,000 |
| Terathane 2900[d] | stannoxane[c] | 40 | 90 | 15 | 94 | 26,000 |
| Terathane 2900[d] | stannoxane[c] | 60 | 95 | 15 | 96 | 17,000 |
| Terathane 2900[d] | dibutyltin dibutoxide | 60 | 90 | 15 | 98 | 30,000 |
| poly(butadiene) diol[e] | dibutyltin dibutoxide | 30 | 90 | 30 | insoluble gel | insoluble gel |

[a]Time required to stop the magnetic stirrer
[b]Poly(ethylene-1,2-butylene) diol, Mw of 3,400
[c]1,1,6,6-tetra-n-butyl-1,6-distanna-2,5,7,10-tetraoxacyclodecane
[d]Polytetramethylene ether glycol, Mw = 2,900 (trade name Hytrel, available from E. I. du Pont Nemours and Company, Wilmington, Delaware)
[e]Poly(butadiene) diol, Mw of 2,800

Example 2

To a 50 ml one-neck round-bottom flask equipped with a magnetic stir, a dean-stark trap, and a condenser, 2.4 grams (10.91 mmol ester groups) of macrocyclic (1,4-butylene terephthalate) oligoester, 3.6 grams (2.48 mmol hydroxyl groups) of polytetramethylene ether glycol Terathane 2900 and 15 ml of o-dichlorobenzene were added. The mixture was heated to reflux in an oil bath at about 190° C. After removal of 3 ml of o-dichlorobenzene, an o-dichlorobenzene solution of tin catalyst Fomrez SUL-11A, which is a 1:1 reaction mixture of dibutyltin dioxide/DIOP plasticizer from Witco Chemicals (Crompton Corporation), was added to yield 0.3 mole % tin based on ester groups. The mixture was heated under reflux in nitrogen atmosphere about 90 minutes. Then, 1.5 mmol of 4,4'-methylenebis(phenyl isocyanate) was added. Significant increase in viscosity was observed immediately. The mixture was heated for another 5 minutes and was cooled to room temperature. The viscous solution was then diluted with o-dichlorobenzene and was added to 100 ml of heptane. The resulting polymer precipitated out of the solution. After filtration, the resulting fibrous polymer product was dried overnight at about 80° C. under vacuum. The polymer product was analyzed by gel permeation chromatography to determined percent polymerization and molecular weight relative to polystyrene. The results are shown in Table 2.

TABLE 2

Co-polymerization of Macrocyclic Oligoesters and Dihydroxyl-Functionalized Polymer with 4,4'-methylenebis(phenyl isocyanate) as chain-extension Agent

| Terathane 2900, wt % | Polymerization Time, minutes | Polymer Yield, % | Mw of Polymer |
|---|---|---|---|
| 40 | 90 | 97 | 85,300 |
| 20 | 90 | 97 | 120,300 |
| 70 | 90 | 96 | 141,200 |
| 50 | 90 | 96 | 128,100 |
| poly(ethylene-co-1,2-butylene) diol; 50% | 90 | 95 | 131,700 |

Example 3

To a small vial (21×70 mm, 4 drum) equipped with a magnetic stir and a nitrogen/vacuum adaptor, 4.0 grams of polyteramethylene ether glycol Terathane 2900, 0.214 gram (1.10 mmol) of dimethyl terephthalate and 2.8 mg (0.011 mmol) of monobutyltin chloride dihydroxide were added. The mixture was heated under vacuum to 190° C. for 30 minutes. Then, 2.67 grams (12.14 mmol) of macrocyclic (1,4-butylene terephthalate) oligoester was added to the viscous liquid mixture. The mixture was heated at about 190° C. under nitrogen for about 60 minutes during which time crystallization of the polymerized product began to yield a white solid. At the end of the polymerization, the vial was cooled to room temperature and was broken to remove polymer product. The polymer product was analyzed by gel permeation chromatography to determined percent polymerization and molecular weight relative to polystrene. The results are shown in Table 3.

TABLE 3

Co-polymerization of Macrocyclic Oligoesters and Dihydroxyl-Functionalized Polymer and Dimethyl Terephthalate

| Terathane 2900, wt % | Polymerization Time, minutes | Polymer Yield, % | Mw of Polymer | $Tm^a$ (° C.) | $\Delta H^b$ (J/g) |
|---|---|---|---|---|---|
| 40 | 60 | 97 | 90,000 | 213 | 25 |
| 60 | 60 | 96 | 85,000 | 210 | 22 |
| 70 | 60 | 95 | 80,000 | 207 | 15 |

$^a$Peak temperature of the melting endotherm determined by DSC with a heating rate of 20° C./min
$^b$Heat of melting determined by DSC with a heating rate of 20° C./min Each of the patent documents disclosed hereinabove is incorporated by reference herein in their entirety. Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for making a block copolymer, the method comprising the step of contacting a macrocyclic oligoester and a dihydroxyl-functionalized polymer at an elevated temperature in the presence of a transesterification catalyst, thereby producing the block copolymer of polyester and the dihydroxyl-functionalized polymer, wherein the macrocyclic oligoester has a structural repeat unit of formula (I):

$$-O-R-O-\underset{\underset{O}{\|}}{C}-A-\underset{\underset{O}{\|}}{C}- \quad (I)$$

wherein R is an alkylene, a cycloalkylene, or a mono- or polyoxyalkylene group; and A is a divalent aromatic or alicyclic group.

2. The method of claim 1 wherein the macrocyclic oligoester comprises at least one of a macrocyclic oligo(1,4-butylene terephthalate) and a macrocyclic oligo(ethylene terephthalate).

3. The method of claim 1 wherein the dihydroxyl-functionalized polymer comprises at least one of a polyethylene ether glycol, a polypropylene ether glycol, a polytetramethylene ether glycol, a polyolefin diol, a polycaprolactone diol, a polyperfluoroether diol, and a polysiloxane diol.

4. The method of claim 1 wherein the dihydroxyl-functionalized polymer comprises at least one of a dihydroxyl-functionalized polyethylene terephthalate and a dihydroxyl-functionalized polybutylene terephthalate.

5. The method of claim 1 wherein the dihydroxyl-functionalized polymer has a molecular weight in a range from about 500 to about 100,000.

6. The method of claim 5 wherein the dihydroxyl-functionalized polymer has a molecular weight in a range from about 500 to about 10,000.

7. The method of claim 1 wherein the weight ratio of the dihydroxyl-functionalized polymer to the macrocyclic oligoester is in a range from about 0.01 to about 10.0.

8. The method of claim 7 wherein the weight ratio of the dihydroxyl-functionalized polymer to the macrocyclic oligoester is in a range from about 0.1 to about 3.0.

9. The method of claim 1 wherein the molecular weight of the block copolymer is in a range from about 10,000 to about 300,000.

10. The method of claim 9 wherein the molecular weight of the block copolymer is in a range from about 40,000 to about 160,000.

11. The method of claim 1 wherein the transesterification catalyst is present in an amount from about 0.01 to about 10 mole percent of the macrocyclic oligoester.

12. The method of claim 1 wherein the transesterification catalyst comprises a tin compound.

13. The method of claim 12 wherein the tin compound comprises at least one of a monoalkyltin(IV) hydroxide oxide, a monoalkyltin(IV) chloride dihydroxide, a dialkyltin (IV) oxide, a bistrialkyltin(IV) oxide, a monoalkyltin(IV) trisalkoxide, a dialkyltin(IV) dialkoxide, a trialkyltin(IV) alkoxide, a tin compound having the formula (IV):

(IV)

and a tin compound having the formula (V):

(V)

wherein:

$R_2$ is a $C_{1-4}$ primary alkyl group, and
$R_3$ is $C_{1-10}$ alkyl group.

14. The method of claim 12 wherein the tin compound comprises at least one of 1,1,6,6-tetra-n-butyl- 1,6-distanna-2,5,7,10-tetraoxacyclodecane, dibutyltin dibutoxide, dibutyltin dioxide, and monobutyltin chloride dihydroxide.

15. The method of claim 1 wherein the transesterification catalyst comprises a titanate compound.

16. The method of claim 15 wherein the titanate compound comprises at least one of (a) tetraisopropyl titanate, (b) isopropyl titanate, (c) tetraalkyl titanate, (d) titanate tetraalkoxide, (e) a titanate compound having the formula (VI):

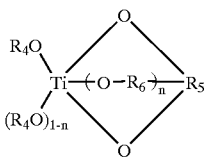

(VI)

wherein:
each $R_4$ is independently an alkyl group, or the two $R_4$ groups taken together form a divalent aliphatic hydrocarbon group;
$R_5$ is a $C_{2-10}$ divalent or trivalent aliphatic hydrocarbon group;
$R_6$ is a methylene or ethylene group; and
n is 0 or 1,
(f) a titanate ester compound having at least one moiety of the formula (VII):

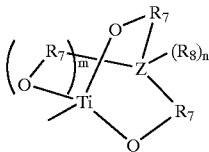

(VII)

wherein:
each $R_7$ is independently a $C_{2-3}$ alkylene group;
Z is O or N;
$R_8$ is a $C_{1-6}$ alkyl group or unsubstituted or substituted phenyl group;
provided when Z is O, m=n=0, and when Z is N, m=0 or 1 and m+n=1,
and (g) a titanate ester compound having at least one moiety of the formula (VIII):

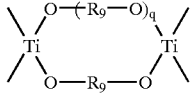

(VIII)

wherein:
each $R_9$ is independently a $C_{2-6}$ alkylene group;
and q is 0 or 1.

17. The method of claim 1 wherein the elevated temperature is within a temperature range from about 130° C. to about 300° C.

18. The method of claim 17 wherein the elevated temperature is within a temperature range from about 150° C. to about 260° C.

19. The method of claim 18 wherein the elevated temperature is within a temperature range from about 170° C. to about 210° C.

20. The method of claim 1 further comprising the step of heating the block copolymer in the presence of a chain extension agent.

21. The method of claim 20 wherein the chain extension agent comprises at least one of a diacid chloride, a diisocyanate, and a diepoxide.

22. The method of claim 21 wherein the chain extension agent comprises at least one of 4,4'-methylenebis(phenyl isocyanate) and terephthaloyl chroride.

23. A block copolymer prepared by the method of claim 1.

24. A composite material comprising the block copolymer prepared by the method of claim 1.

25. An article of manufacture comprising the block copolymer prepared by the method of claim 1.

26. The method of claim 1 further comprising the step of heating the dihydroxyl-functionalized polymer with a diester at a temperature range from about 130° C. to about 300° C. in the presence of a transesterification catalyst before the step of contacting a macrocyclic oligoester and a dihydroxyl-functionalized polymer at an elevated temperature in the presence of a transesterification catalyst.

27. The method of claim 26 wherein the diester comprises a dimethyl terephthalate.

28. The method of claim 26 wherein the temperature range is from about 150° C. to about 260° C.

29. The method of claim 28 wherein the temperature range is from about 170° C. to about 210° C.

30. A method for making high molecular weight block copolymer comprising the steps of:
(a) contacting a macrocyclic oligoester and a dihydroxyl-functionalized polymer at an elevated temperature in the presence of a transesterification catalyst to produce the block copolymer of polyester and the dihydroxyl-functionalized polymer; and
(b) heating the block copolymer in the presence of a chain extension agent, thereby producing a high molecular weight block copolymer of polyester and the dihydroxyl-functionalized polymer,
wherein the macrocyclic oligoester has a structural repeat unit of formula (I):

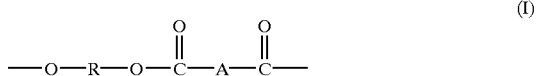

(I)

wherein R is an alkylene, a cycloalkylene, or a mono- or polyoxyalkylene group; and A is a divalent aromatic or alicyclic group.

31. The method of claim 30 wherein step (b) comprises heating at a temperature range from about 130° C. to about 300° C.

32. The method of claim 30 wherein step (b) comprises heating at a temperature range from about 150° C. to about 260° C.

33. The method of claim 30 wherein step (b) comprises heating at a temperature range from about 170° C. to about 210° C.

34. A block copolymer comprising a first block unit comprising, within its polymeric backbone, at least one first structural unit of formula (VI)

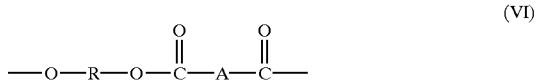

(VI)

where R is an alkylene, or a cycloalkylene or a mono- or polyoxyalkylene group, and A is a divalent aromatic or alicyclic group; and a second block unit comprising, within its polymeric backbone, at least one second structural unit of formula (VII)

—B— (VII)

where B is an alkylene, or a cycloalkylene or a mono- or polyoxyalkylene group, one or more of the carbon atoms in B may be replaced with an oxygen atom, a nitrogen atom, or a sulfur atom.

35. The block copolymer of claim 34 wherein B comprises at least one of a polyethylene ether group, a polypropylene ether group, a polymethylene ether group, a polyolefin group, a polycaprolactone group, a polyperfluoroether diol, and a polysiloxane diol.

36. A composite material comprising the block copolymer of claim 34.

37. An article of manufacture comprising the block polymer of claim 34.

38. The block copolymer of claim 34 having a molecular weight of from about 10,000 to about 300,000.

39. A method for making high molecular weight block copolymer comprising the steps of:

(a) heating a dihydroxyl-functionalized polymer with a diester in the presence of a transesterification catalyst thereby producing a chain-extended dihydroxyl-functionalized polymer; and (b) contacting the chain-extended dihydroxyl-functionalized polymer with a macrocyclic oligoester at an elevated temperature in the presence of a transesterification catalyst, thereby producing a block copolymer of polyester and the chain-extended dihydroxyl-functionalized polymer, wherein the macrocyclic oligoester has a structural repeat unit of formula (I):

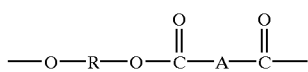

(I)

wherein R is an alkylene, a cycloalkylene, or a mono- or polyoxyalkylene group; and A is a divalent aromatic or alicyclic group.

40. The method of claim 39 wherein the diester comprises dimethyl terephthalate.

41. The method of claim 40 wherein step (a) comprises heating at a temperature range from about 130° C. to about 300° C.

42. The method of claim 41 wherein step (a) comprises heating at a temperature range from about 150° C. to about 260° C.

43. The method of claim 39 wherein step (a) comprises heating at a temperature range from about 170° C. to about 210° C.

44. A method for extending the chain length of a polyester polymer comprising the step of contacting the polyester polymer and a chain extension agent at an elevated temperature.

45. The method of claim 44 wherein the chain extension agent comprises at least one of a diacid chloride, a diisocyanate, and a diepoxide.

46. The method of claim 45 wherein the chain extension agent comprises at least one of 4,4'-methylenebis(phenyl isocyanate) and terephthaloyl chloride.

47. The method of claim 44 wherein the polyester polymer comprises a copolymer of a macrocyclic oligoester and a dihydroxyl-functionalized polymer.

* * * * *